United States Patent
Yamasaki

(10) Patent No.: US 9,948,816 B2
(45) Date of Patent: Apr. 17, 2018

(54) MITIGATING DEGRADATION OF A MEMORY IN AN IMAGE FORMING SYSTEM

(71) Applicant: FUJI XEROX CO., LTD., Tokyo (JP)

(72) Inventor: Naoto Yamasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/098,013

(22) Filed: Apr. 13, 2016

(65) Prior Publication Data
US 2017/0118370 A1 Apr. 27, 2017

(30) Foreign Application Priority Data
Oct. 23, 2015 (JP) .................. 2015-208843

(51) Int. Cl.
| | |
|---|---|
| *H04N 1/21* | (2006.01) |
| *H04N 1/50* | (2006.01) |
| *G06K 15/12* | (2006.01) |
| *H04N 1/32* | (2006.01) |

(52) U.S. Cl.
CPC ......... *H04N 1/2104* (2013.01); *G06K 15/129* (2013.01); *H04N 1/32486* (2013.01); *H04N 1/50* (2013.01)

(58) Field of Classification Search
CPC ............................. H04N 1/2104; H04N 1/50
USPC .............................................. 358/1.13, 1.15
See application file for complete search history.

(56) References Cited

U.S. PATENT DOCUMENTS

| | | | |
|---|---|---|---|
| 8,498,000 B1 | 7/2013 | Komazawa | |
| 9,606,759 B2* | 3/2017 | Hamayama | G06F 3/1238 |
| 2004/0218208 A1* | 11/2004 | Akiyoshi | G06F 8/41 |
| | | | 358/1.15 |
| 2009/0244611 A1* | 10/2009 | Tanaka | G06F 3/121 |
| | | | 358/1.15 |
| 2012/0306529 A1* | 12/2012 | Omori | G01R 31/048 |
| | | | 324/763.01 |
| 2013/0176589 A1* | 7/2013 | Nakamura | G06F 3/1297 |
| | | | 358/1.15 |
| 2015/0312435 A1* | 10/2015 | Yanagawa | H04N 1/00978 |
| | | | 358/1.15 |

(Continued)

FOREIGN PATENT DOCUMENTS

| | | |
|---|---|---|
| JP | 2006-285720 A | 10/2006 |
| JP | 2009-006570 A | 1/2009 |
| JP | 2013-200627 A | 10/2013 |

*Primary Examiner* — Eric A Rust
(74) *Attorney, Agent, or Firm* — Oliff PLC

(57) ABSTRACT

Provided is an image forming system including an image forming apparatus, and a processing apparatus that is provided in the image forming apparatus, wherein the processing apparatus includes a memory that stores at least image data, a determiner that determines degradation status of the memory, and an interface unit that is used for connection of a processing-apparatus-side display device which displays information of the processing apparatus, the image forming apparatus includes an image-forming-apparatus-side display that displays information of the image forming apparatus, and the processing apparatus causes the image-forming-apparatus-side display to display an alert in a case where the determiner determines that the degradation status satisfies a predetermined condition, when the processing-apparatus-side display device is not connected to the interface unit.

11 Claims, 10 Drawing Sheets

(56) References Cited

U.S. PATENT DOCUMENTS

2016/0188215 A1\* 6/2016 Ikeda .................. G06F 11/1004
711/103

\* cited by examiner

MITIGATING DEGRADATION OF A MEMORY IN AN IMAGE FORMING SYSTEM

CROSS-REFERENCE TO RELATED APPLICATIONS

This application is based on and claims priority under 35 USC 119 from Japanese Patent Application No. 2015-208843 filed Oct. 23, 2015.

BACKGROUND (i) Technical Field

The present invention relates to an image forming system.

(ii) Related Art

A high-speed high-resolution printing system such as a continuous paper printer requires high-speed processing of generating print image data and thus employs a configuration in which multiple image processing apparatuses parallelly perform the processing. Each of the multiple image processing apparatuses generates the image data in order and stores the image data in a storage device group called "spool" and also reads the image data stored in the storage device group in order and outputs the image data to a printing device. In many cases, the spool is configured by combining multiple hard disk drives (HDD). However, physical (mechanical) degradation of the HDD increases the frequency of data write errors or data read errors. As a consequence, the frequency of retries of data writes or data reads is also increased, and the processing of the entire printing system may be delayed.

SUMMARY

According to an aspect of the invention, there is provided an image forming system including:
an image forming apparatus; and
a processing apparatus that is provided in the image forming apparatus,
wherein the processing apparatus includes
a memory that stores at least image data,
a generator that generates drawing data or intermediate data based on the image data stored in the memory, the intermediate data being intermediately generated in generation of the drawing data based on the image data,
a transmitter that transmits the drawing data or the intermediate data generated by the generator to the image forming apparatus,
a determiner that determines degradation status of the memory, and
an interface unit that is used for connection of a processing-apparatus-side display device which displays information of the processing apparatus,
the image forming apparatus includes
an image former that forms an image on a medium based on the drawing data or the intermediate data received from the processing apparatus, and
an image-forming-apparatus-side display that displays information of the image forming apparatus, and
the processing apparatus causes the image-forming-apparatus-side display to display an alert in a case where the determiner determines that the degradation status satisfies a predetermined condition, when the processing-apparatus-side display device is not connected to the interface unit.

BRIEF DESCRIPTION OF THE DRAWINGS

Exemplary embodiments of the present invention will be described in detail based on the following figures, wherein.

DETAILED DESCRIPTION (Exemplary Embodiment)

Figure 1:
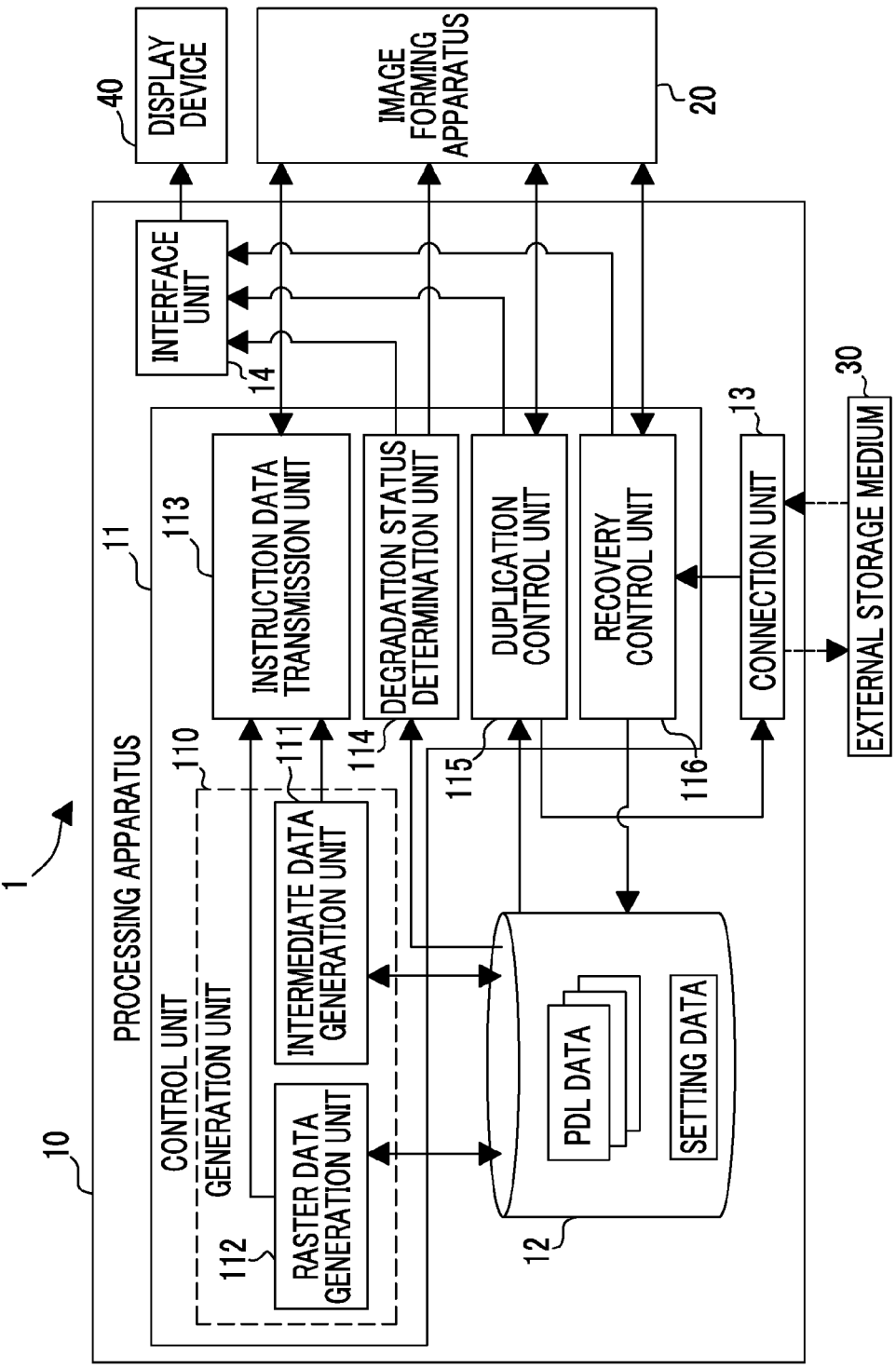
FIG. 1 is a block diagram illustrating an entire configuration of an image forming system according to an exemplary embodiment of the present invention.

FIG. 1 is a block diagram illustrating an entire configuration of an image forming system 1 according to an exemplary embodiment of the present invention. The image forming system 1 includes a processing apparatus 10 and an image forming apparatus 20. The image forming apparatus 20 is an apparatus, for example, a production printer, that creates, for example, various printed matters for industrial use. However, the specific application of the image forming apparatus 20 does not matter provided that the image forming apparatus 20 is an apparatus performing image formation. The image forming apparatus 20 forms an image on a medium such as a paper through an electrophotographic process using, for example, four color toners of yellow (Y), magenta (M), cyan (C), and black (K). The processing apparatus 10 is provided in the image forming apparatus 20. The processing apparatus is, for example, a desktop computer apparatus. The processing apparatus 10 is connected to the image forming apparatus 20 through a communication line such as a local area network (LAN). The connection between the processing apparatus 10 and the image forming apparatus 20 may be wired or wireless.

As illustrated in FIG. 1, the processing apparatus 10 includes a control unit 11, an HDD 12, a connection unit 13, and an interface unit 14 as hardware circuits.

The control unit 11 functions as a controller that controls each unit of the processing apparatus 10. The control unit 11 includes, for example, a processor as an operation processing device that includes a central processing unit (CPU), a read-only memory (ROM), and a random access memory (RAM); an image processing unit such as an application-specific integrated circuit (ASIC); and a communication unit such as a data communication card.

The HDD 12 functions as a memory that is incorporated into the processing apparatus 10. In the present exemplary embodiment, only one HDD 12 is provided in the processing apparatus 10. The HDD 12 stores data in which an image drawing process is described in a page description language (PDL) (hereinafter, the data will be referred to as "PDL data"). The PDL data is an example of image data of the present invention. The PDL data is an example of data in vector format of the present invention. The vector format is a format in which an image is represented using geometric figures such as lines, polygons, circles, and various curves constituting the image; information that indicates objects, such as bitmap data; and information that indicates coordinates or layers in which the objects are arranged. Examples of the page description language include LIPS (registered trademark) and POSTSCRIPT (registered trademark), though not limited thereto. The HDD 12 stores setting data that indicates settings related to the image formation performed by the image forming apparatus 20.

Data that is stored in the HDD 12 is data obtained from, for example, an external apparatus, not illustrated, and stored therein.

The connection unit 13 includes, for example, a UNIVERSAL SERIAL BUS (USB) port and functions as a connector to which an external storage medium 30 is detachably connected. The external storage medium 30 is a removable medium (auxiliary storage device) such as an external HDD or a USB memory and functions as an external storage medium that stores data.

The interface unit 14 is used for connection of a display device 40. The display device 40 is, for example, a liquid crystal display, on the processing-apparatus-side of the image forming system 1 that is used to display information of the processing apparatus 10. The display device 40 is detachably connected to the processing apparatus 10.

The processing apparatus 10 that includes the hardware circuits described above may not include a display that displays an image for notification of information to a user and an operator that is used to receive an operational input from the user, such as a keyboard or a mouse.

Figure 2:
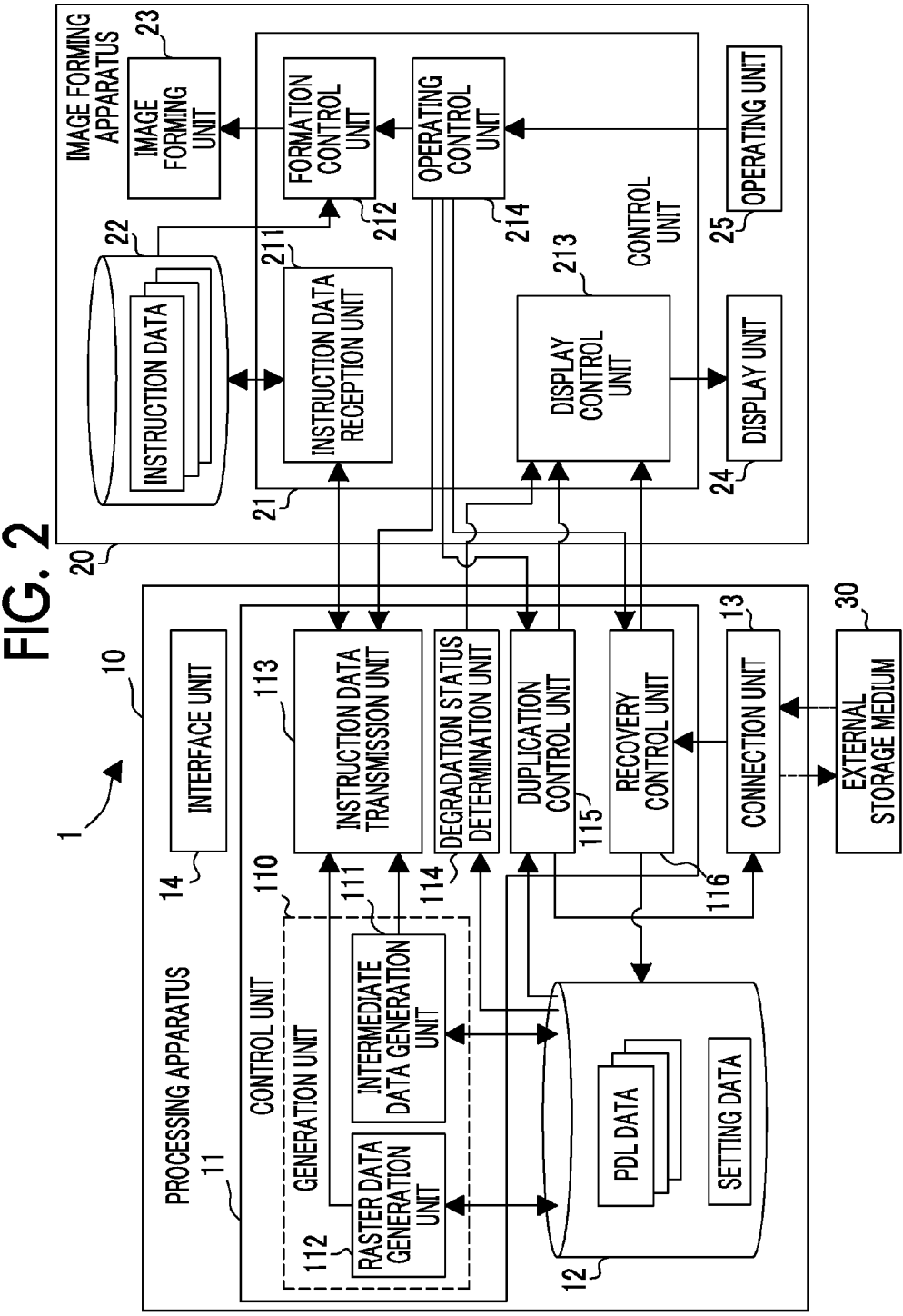
FIG. 2 is a diagram illustrating a detailed configuration of a processing apparatus and an image forming apparatus according to the exemplary embodiment.

FIG. 2 is a diagram illustrating a detailed configuration of the processing apparatus 10 and the image forming apparatus 20. In FIG. 2, the display device 40 is not connected to the interface unit 14. The image forming apparatus 20 includes a control unit 21, an HDD 22, an image forming unit 23, a display unit 24, and an operating unit 25 as hardware circuits.

The control unit 21 functions as a controller that controls each unit of the image forming apparatus 20. The control unit 21 includes, for example, a processor as an operation processing device that includes a CPU, a ROM, and a RAM; an image processing unit such as an ASIC; and a communication unit such as a modem.

The HDD 22 functions as a memory that stores instruction data received from the processing apparatus 10. The instruction data is instructs the image forming apparatus 20 to form an image. The image forming unit 23 functions as an image former that forms an image on a medium such as a paper through an electrophotographic process. The display unit 24 includes, for example, a liquid crystal display and functions as a display on the image forming apparatus 20 side of the image forming system 1 that is used to display information of the image forming apparatus 20. The operating unit 25 includes, for example, a touch sensor provided in an overlapping manner on a display face of the display unit 24 and a physical button and functions as an operator that receives an operational input from the user.

Next, functional configurations of the control unit 11 and the control unit 21 will be described. The control unit 11 achieves functions that correspond to a generation unit 110, an instruction data transmission unit 113, a degradation status determination unit 114, a duplication control unit 115, and a recovery control unit 116.

The generation unit 110 includes an intermediate data generation unit 111 and a raster data generation unit 112 and functions as a generator that generates raster data or intermediate data based on the PDL data stored in the HDD 12. The intermediate data generation unit 111 functions as an intermediate data generator that accesses the HDD 12 to generate the intermediate data based on the PDL data. The intermediate data refers to data in a format into which the PDL data is intermediately converted, the format being appropriate for image processing that is applied in generation of the raster data. The raster data generation unit 112 functions as a raster data generator that accesses the HDD 12 to generate the raster data based on the PDL data. The raster data is image data in raster format. The raster data is an example of drawing data of the present invention and represents an image that is drawn based on the PDL data. While the raster data is generated from the intermediate data which is converted from the PDL data in the present exemplary embodiment, the raster data may be generated from the PDL data without the intermediate data.

The instruction data transmission unit 113 functions as a transmitter that transmits the instruction data, data indicating an image forming instruction, to the image forming apparatus 20 based on the PDL data stored in the HDD 12. The instruction data transmitted by the instruction data transmission unit 113 may include the raster data generated by the raster data generation unit 112 or the intermediate data generated by the intermediate data generation unit 111.

The degradation status determination unit 114 functions as a determiner that determines the degradation status of the HDD 12. The degradation status determination unit 114 obtains S.M.A.R.T. information from the HDD 12 and determines the degradation status of the HDD 12 based on the S.M.A.R.T. information. The S.M.A.R.T. information is information that indicates the degradation status of the HDD 12. The S.M.A.R.T. information includes, for example, the value of "Read errors corrected with possible delays", that is, the value of the number of retries due to data read errors, and the values of the rate of read error occurrences (Raw Read Error Rate), the number of bad sectors reallocated (Reallocated Sectors Count), the rate of seek errors (Seek Error Rate), an internal temperature, and the number of times that sector reallocations are performed (Reallocation Event Count). Specifically, for example, progression of degradation of an HDD tends to increase the number of retries due to data read errors. Thus, if the value of "Read errors corrected with possible delays" increases, the HDD may be determined to be degraded. In the same manner, progression of degradation of the HDD tends to increase the rate of read error occurrences, the number of bad sectors reallocated, the rate of seek errors, and the number of times that sector reallocations are performed and also increase the internal temperature of the HDD. Thus, the status of degradation may be recognized using information that is highly correlated with degradation of the HDD. The degradation status determination unit 114 compares the value of each item with a threshold that is defined for the item, and if there is at least one item of which the value exceeds the threshold, determines that a degradation condition indicating degradation of the HDD 12 is satisfied. The HDD 12 that satisfies the degradation condition is estimated to exhibit a sign of malfunction.

The method according to the present exemplary embodiment for determining a sign of malfunction in the HDD 12 is for illustrative purposes only, and other methods may be employed.

The duplication control unit 115 functions as a duplication controller that stores in the external storage medium 30 duplicated data which results from duplication of the data stored in the HDD 12, when the external storage medium 30 is connected to the connection unit 13 in a case where the degradation status determination unit 114 determines the HDD 12 to satisfy the degradation condition.

The recovery control unit 116 functions as a recovery controller that recovers data to the HDD 12 based on the duplicated data in a case where the duplicated data is stored in the external storage medium 30 connected to the connection unit 13. Recovery of data that is referred hereto means a process that duplicates the data previously duplicated from the HDD 12 to the external storage medium 30 to the HDD 12 from the external storage medium 30.

The control unit 21 achieves functions that correspond to an instruction data reception unit 211, a formation control unit 212, a display control unit 213, and an operating control unit 214.

The instruction data reception unit 211 functions as an instruction data receiver that receives the instruction data transmitted by the instruction data transmission unit 113. The instruction data reception unit 211 stores the received instruction data in the HDD 22.

The formation control unit 212 reads the instruction data stored in the HDD 22 and controls the image forming unit 23 to form an image based on the instruction data. The formation control unit 212 functions as a formation controller. The formation control unit 212, if the instruction data includes the intermediate data, interprets the intermediate data to generate the raster data and supplies the raster data to the image forming unit 23.

The display control unit 213 functions as a display controller that causes the display unit 24 to display a screen used for notification of information to the user. The display control unit 213 displays a screen (for example, a dialog box) that inquires of the user whether to perform a certain process.

The operating control unit 214 functions as an operating controller that performs a control in response to an operational input received from the user through the operating unit 25.

Next, operation of the present exemplary embodiment will be described.

A: Process Performed upon Image Formation

Figure 3:
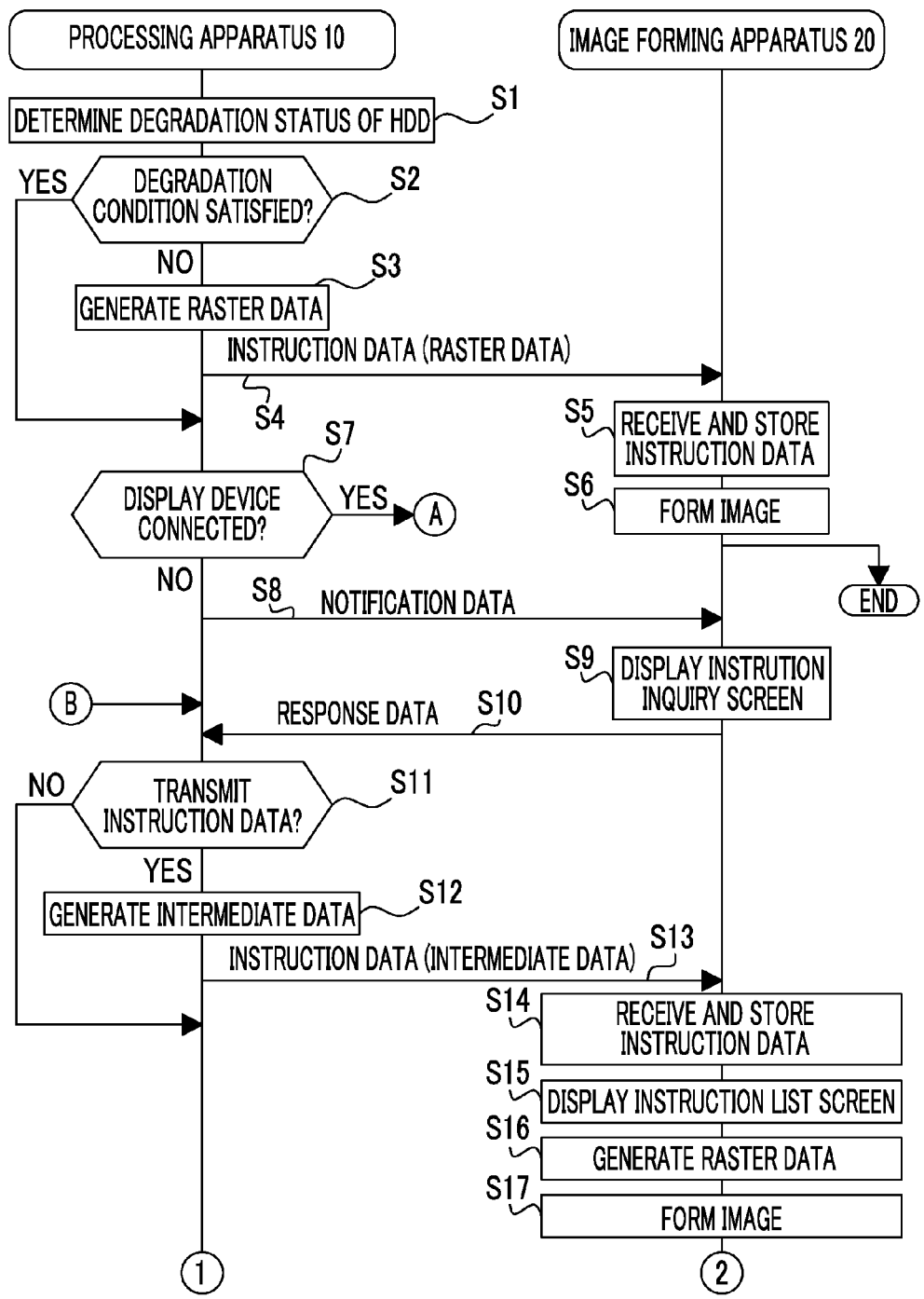
FIG. 3 is a sequence chart illustrating a process that is performed upon image formation in the image forming system according to the exemplary embodiment.

FIG. 3 is a sequence chart illustrating a process that is performed upon image formation in the image forming system 1.

In the processing apparatus 10, the degradation status determination unit 114 determines the degradation status of the HDD 12 based on the S.M.A.R.T. information obtained from the HDD 12 (Step S1). The degradation status determination unit 114 determines the degradation status at one or more timings of a launch of an image forming function of the image forming apparatus 20, the start of generation of the intermediate data, the end of the generation of the intermediate data, the start of image formation in the image forming apparatus 20, and the end of the image formation. However, the determination of Step S1 may be performed at any timing other than these timings.

Next, the degradation status determination unit 114 determines whether the HDD 12 satisfies the degradation condition (Step S2).

In a case of a "NO" determination in Step S2, that is, in a case where the HDD 12 does not exhibit a sign of malfunction without satisfaction of the degradation condition, the raster data generation unit 112 interprets the PDL data of the HDD 12 to generate the raster data (Step S3). The instruction data transmission unit 113 transmits the instruction data that includes the generated raster data to the image forming apparatus 20 (Step S4). In Step S4, the setting data may be transmitted along with the instruction data.

In the image forming apparatus 20, if the instruction data reception unit 211 receives the instruction data from the processing apparatus 10, the instruction data reception unit 211 stores the instruction data in the HDD 22 (Step S5). Then, the formation control unit 212 reads the instruction data in order from the HDD 22 and causes the image forming unit 23 to form an image in accordance with the setting data (Step S6). At this point, the formation control unit 212 supplies the raster data included in the instruction data to the image forming unit 23.

A control performed in a case of no sign of malfunction in the HDD 12 is described above.

In a case of a "YES" determination in Step S2, that is, in a case where the HDD 12 exhibits a sign of malfunction with satisfaction of the degradation condition, the degradation status determination unit 114 determines whether the display device 40 is connected to the interface unit 14 (Step S7). In a case of a "NO" determination in Step S7, that is, if the display device 40 is determined not to be connected, the degradation status determination unit 114 transmits notification data for notification of disconnection of the display device 40 to the image forming apparatus 20 (Step S8).

In the image forming apparatus 20, the display control unit 213 causes the display unit 24 to display an instruction inquiry screen in response to reception of the notification data transmitted in Step S8 (Step S9). The instruction inquiry screen is a screen that displays an alert indicating a sign of malfunction in the HDD 12 and here is a screen used to inquire of the user whether to instruct the image forming apparatus 20 to form an image in a batch manner based on the PDL data stored in the HDD 12. For example, all pieces of the PDL data stored in the HDD 12 are the target of the batch instruction.

Figure 4:
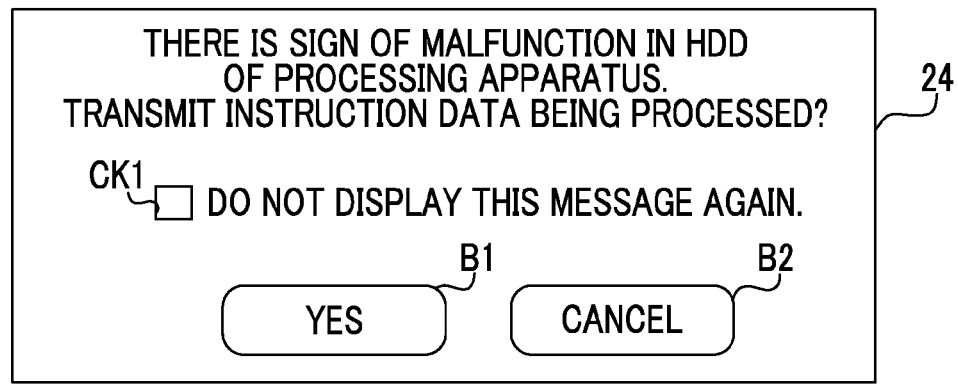
FIG. 4 is a diagram illustrating an instruction inquiry screen according to the exemplary embodiment.

FIG. 4 is a diagram illustrating the instruction inquiry screen.

The instruction inquire screen illustrated in FIG. 4 displays the message of "THERE IS SIGN OF MALFUNCTION IN HDD OF PROCESSING APPARATUS. TRANSMIT INSTRUCTION DATA BEING PROCESSED?", a handler image B1 marked with "YES", a handler image B2 marked with "CANCEL", and a check box CK1 correlated with the message of "DO NOT DISPLAY THIS MESSAGE AGAIN". The user uses the operating unit 25 to perform an operation of selecting the handler image B1 in a case of instructing the image forming apparatus 20 to form an image or the handler image B2 in a case of not instructing the image forming apparatus 20 to form an image. The check box CK1 is selected in a case of not performing further inquiries with the instruction inquiry screen.

The operating control unit 214 transmits response data that indicates a response from the user to the processing apparatus 10 in response to an operational input on the instruction inquiry screen (Step S10).

In the processing apparatus 10, the instruction data transmission unit 113 determines whether to transmit the instruction data based on the received response data (Step S11). In a case of a "YES" determination in Step S11, the intermediate data generation unit 111 generates the intermediate data from each of all pieces of the PDL data stored in the HDD 12 (Step S12). Then, the instruction data transmission unit 113 transmits the instruction data that includes the intermediate data and not includes the raster data to the image forming apparatus 20 in order (Step S13). In general, generation of the intermediate data has a smaller amount of processing time and a lower frequency of data reads and writes on the HDD 12 than generation of the raster data. Thus, in the status of the HDD 12 exhibiting a sign of malfunction, the format of the data included in the instruction data is changed in the processing apparatus 10 in order to decrease the frequency of accesses to the HDD 12.

In the image forming apparatus 20, if the instruction data reception unit 211 receives the instruction data transmitted by the instruction data transmission unit 113, the instruction data reception unit 211 stores the instruction data in the HDD 22 (Step S14). Then, the display control unit 213 causes the display unit 24 to display an instruction list screen (Step S15). The instruction list screen is a list of pieces of the instruction data stored in the HDD 22 and is a screen in a format in which the user may select the instruction data which is the target of image formation.

The formation control unit 212 reads the instruction data from the HDD 22 by targeting the instruction data that is selected from the instruction list screen by an operational input on the operating unit 25. Then, the formation control unit 212, if the read instruction data includes the intermediate data, generates the raster data from the intermediate data (Step S16). Then, the formation control unit 212 supplies the generated raster data to the image forming unit 23 to form an image (Step S17).

Figure 5:
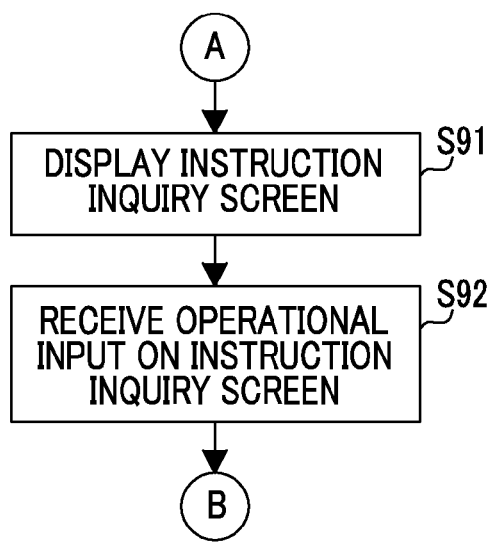
FIG. 5 is a diagram illustrating a process that is performed in a case of a "YES" determination in Step S7 of FIG. 3.

In a case of a "YES" determination in Step S7, that is, if the display device 40 is determined to be connected, the degradation status determination unit 114 transmits screen data used for displaying of the instruction inquiry screen to the display device 40 through the interface unit 14 and causes the display device 40 to display the instruction inquiry screen (Step S91 in FIG. 5). The instruction inquiry screen that is displayed in Step S91 is a screen that displays an alert indicating a sign of malfunction in the HDD 12 and may include the same information as the instruction inquiry screen described in FIG. 4. Then, the degradation status determination unit 114 receives an operational input that indicates a response from the user, in response to an operational input on the instruction inquiry screen (Step S92). This operation may be performed using an operator of the display device 40 if the display device 40 includes an operator or using an operator of the processing apparatus 10 if the processing apparatus 10 includes an operator. Then, Step S11 and the subsequent processes are performed in the processing apparatus 10 based on the response.

A control performed in a case of a sign of malfunction in the HDD 12 is described above. In this manner, if there is a sign of malfunction in the HDD 12, the processing apparatus 10 prompts the user to instruct the image forming apparatus 20 to form an image in a batch manner by notifying the user of information using the display unit 24 of the image forming apparatus 20. Then, if the user chooses to perform the batch instruction, the image forming apparatus 20 may form an image without being controlled by the processing apparatus 10 after the instruction data is transmitted from the processing apparatus 10 to the image forming apparatus 20.

In a case of a "NO" determination in Step S11, the instruction data transmission unit 113 ends the process of FIG. 3. If the check box CK1 is selected, the process of Step S8 is omitted. In this case, a processing mode that is selected by the user upon selection of the check box CK1 is applied.

B: Duplication Control

Figure 6:
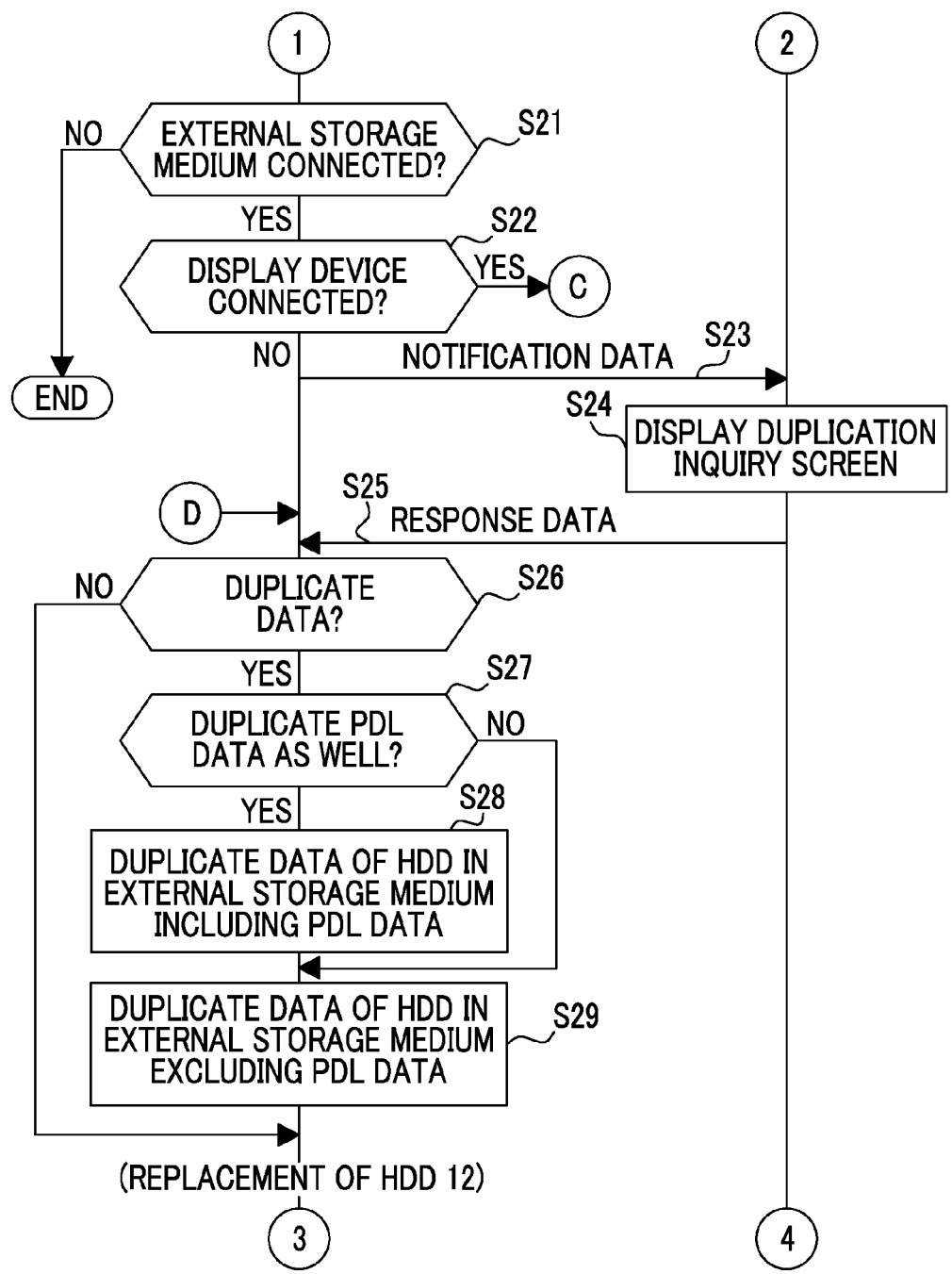
FIG. 6 is a sequence chart illustrating a process that is related to a duplication control and performed in the image forming system according to the exemplary embodiment.

FIG. 6 is a sequence chart illustrating a process that is related to a duplication control and performed continuously after the process of FIG. 3 in the image forming system 1. At the start of the duplication control, it is assumed that the HDD 12 exhibits a sign of malfunction and that the image forming apparatus 20 is forming an image based on the instruction data selected from the instruction list screen.

First, the duplication control unit 115 determines whether the external storage medium 30 is connected to the connection unit 13 (Step S21). If the external storage medium 30 is determined to be connected (YES in Step S21), the duplication control unit 115 determines whether the display device 40 is connected to the interface unit 14 (Step S22). In a case of a "NO" determination in Step S22, that is, if the display device 40 is determined not to be connected, the duplication control unit 115 transmits notification data for notification of connection of the external storage medium 30 to the image forming apparatus 20 (Step S23).

In the image forming apparatus 20, the display control unit 213 causes the display unit 24 to display a duplication inquiry screen in response to reception of the notification data transmitted in Step S23 (Step S24). The duplication inquiry screen is a screen that is used to inquire of the user whether to duplicate the data stored in the HDD 12 to the external storage medium 30 for the purpose of backup.

Figure 7:
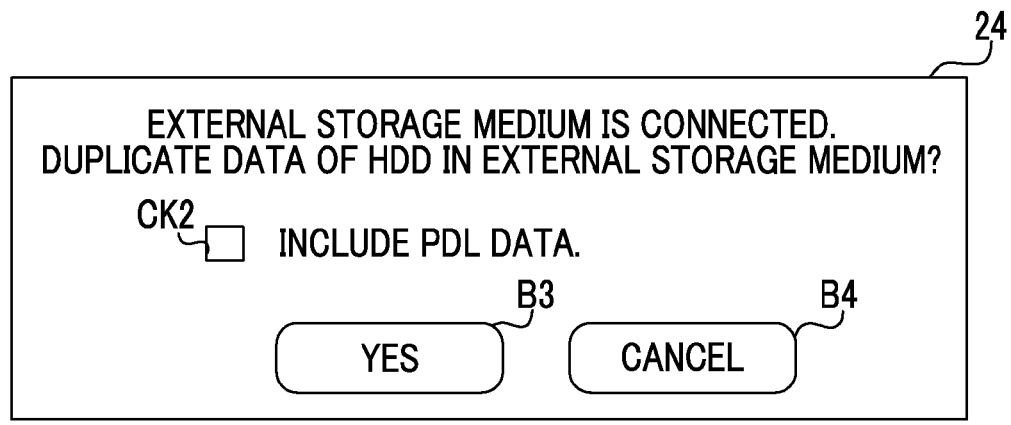
FIG. 7 is a diagram illustrating a duplication inquiry screen according to the exemplary embodiment.

FIG. 7 is a diagram illustrating the duplication inquiry screen.

The duplication inquiry screen illustrated in FIG. 7 displays the message of "EXTERNAL STORAGE MEDIUM IS CONNECTED. DUPLICATE DATA OF HDD TO EXTERNAL STORAGE MEDIUM?", a handler image B3 marked with "YES", a handler image B4 marked with "CANCEL", and a check box CK2 correlated with the message of "INCLUDE PDL DATA.". The user uses the operating unit 25 to perform an operation of selecting the handler image B3 in a case of duplicating the data stored in the HDD 12 to the external storage medium 30 or the handler image B4 in a case of not duplicating the data. The check box CK2 is selected in a case of including the PDL data in the data to be stored in the external storage medium 30.

The operating control unit 214 transmits response data that indicates a response from the user to the processing apparatus 10 in response to an operational input on the duplication inquiry screen (Step S25). In the processing apparatus 10, the duplication control unit 115 determines whether to duplicate data based on the received response data (Step S26). In a case of a "YES" determination in Step S26, the duplication control unit 115 determines whether to duplicate the PDL data as well (Step S27). In a case of a "YES" determination in Step S27, the duplication control unit 115 duplicates the data of the HDD 12 including the PDL data in the external storage medium 30 (Step S28). The PDL data is duplicated in a case where, for example, the PDL data is managed in a batch manner on a server.

In a case of a "NO" determination in Step S27, the duplication control unit 115 duplicates the data of the HDD 12 excluding the PDL data in the external storage medium 30 (Step S29). The PDL data is not duplicated in a case where, for example, image formation based on the PDL data is not required.

In a case of a "NO" determination in Step S26, the duplication control unit 115 does not duplicate the data of the HDD 12 to the external storage medium 30.

Figure 8:
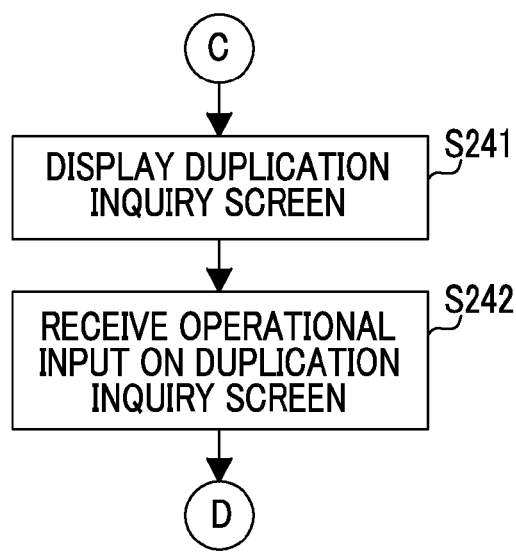
FIG. 8 is a diagram illustrating a process that is performed in a case of a "YES" determination in Step S22 of FIG. 6.

In a case of a "YES" determination in Step S22, that is, if the display device 40 is determined to be connected, the duplication control unit 115 transmits screen data used for displaying of the duplication inquiry screen to the display device 40 through the interface unit 14 and causes the display device 40 to display the duplication inquiry screen (Step S241 in FIG. 8). The duplication inquiry screen displayed in Step S241 may include the same information as the duplication inquiry screen described in FIG. 7. Then, the duplication control unit 115 receives an operational input that indicates a response from the user, in response to an operational input on the duplication inquiry screen (Step S242). This operation may be performed using an operator of the display device 40 if the display device 40 includes an operator or using an operator of the processing apparatus 10 if the processing apparatus 10 includes an operator. Then, Step S26 and the subsequent processes are performed in the processing apparatus 10 based on the response.

The HDD 12 maybe replaced with a new one if the processes described above are completed. The duplication control unit 115 may perform a control that causes the display unit 24 of the image forming apparatus 20 to display the availability of replacement of the HDD 12. As such, the processing apparatus 10 prompts the user to duplicate the data of the HDD 12 to the external storage medium 30 by notifying the user of information using the display unit 24 of the image forming apparatus 20.

C: Recovery Control

Figure 9:
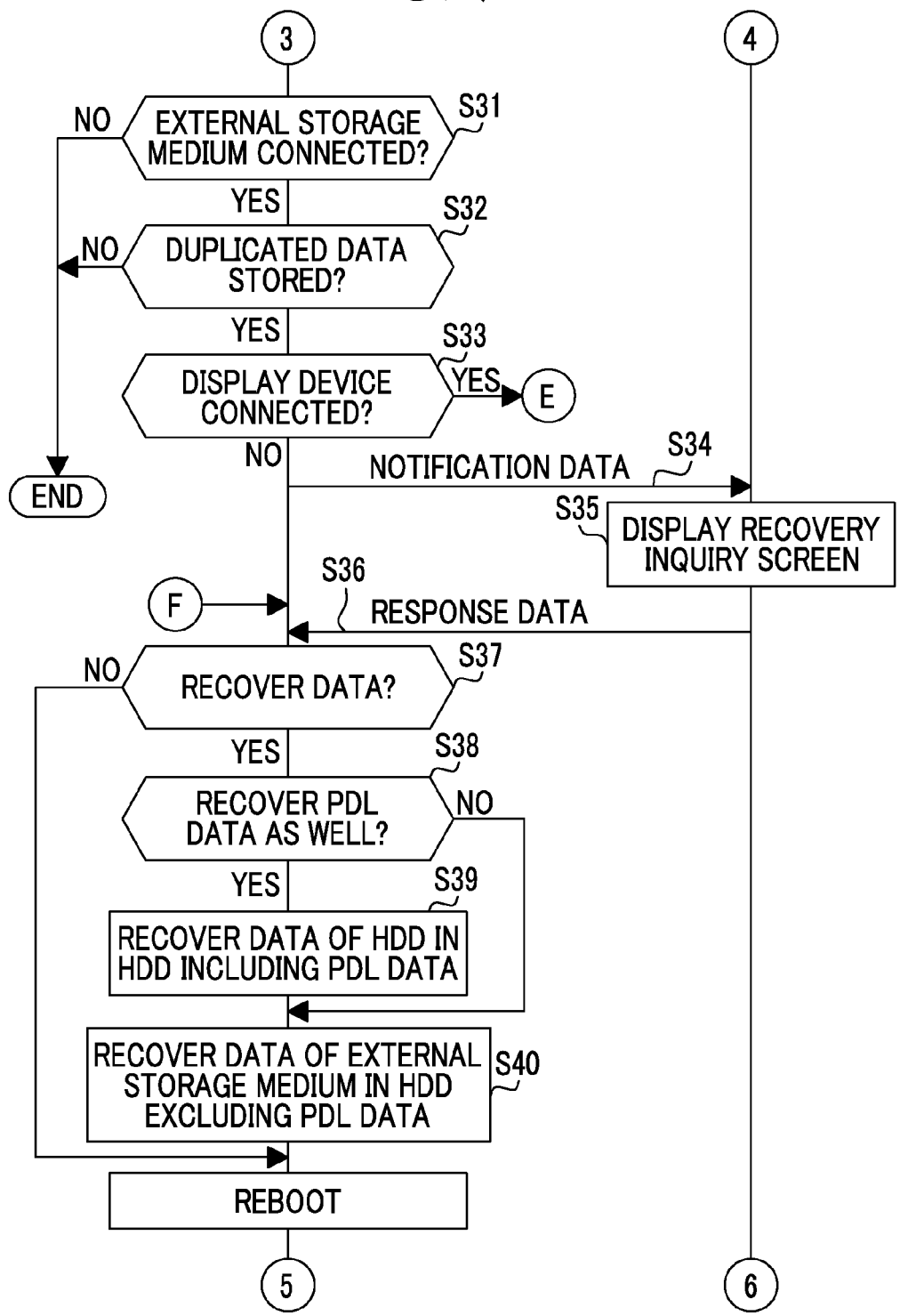
FIG. 9 is a sequence chart illustrating a process that is related to a recovery control and performed in the image forming system according to the exemplary embodiment.

FIG. 9 is a sequence chart illustrating a process that is related to a recovery control and performed continuously after the process of FIG. 6 in the image forming system 1. At the start of the recovery control, the HDD 12 is replaced with a new one. In the image forming apparatus 20, at a timing of the recovery control performed, image formation is either being performed based on the instruction data selected from the instruction list screen or is not being performed.

First, the recovery control unit 116 determines whether the external storage medium 30 is connected to the connection unit 13 (Step S31). If the external storage medium 30 is determined to be connected (YES in Step S31), the recovery control unit 116 determines whether the duplicated data is stored in the external storage medium 30 (Step S32). If the duplicated data is determined to be stored (YES in Step S32), the recovery control unit 116 determines whether the display device 40 is connected (Step S33). In a case of a "NO" determination in Step S33, that is, if the display device 40 is determined not to be connected, the duplication control unit 115 transmits notification data for notification of disconnection of the display device 40 to the image forming apparatus 20 (Step S34).

In the image forming apparatus 20, the display control unit 213 causes the display unit 24 to display a recovery inquiry screen in response to reception of the notification data transmitted in Step S34 (Step S35). The recovery inquiry screen is used to inquire of the user whether to store the data stored by the external storage medium 30 in a newly replaced HDD 12 for the purpose of restoration.

Figure 10:
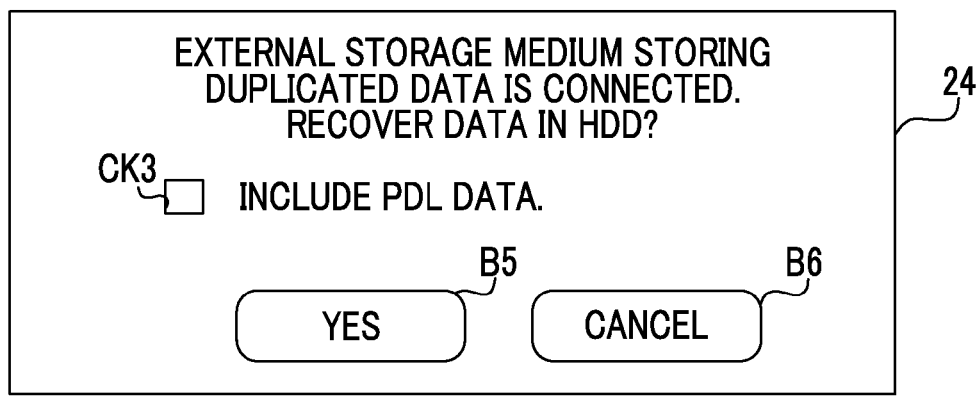
FIG. 10 is a diagram illustrating a recovery inquiry screen according to the exemplary embodiment.

FIG. 10 is a diagram illustrating the recovery inquiry screen.

The recovery inquiry screen illustrated in FIG. 10 displays the message of "EXTERNAL STORAGE MEDIUM STORING DUPLICATED DATA IS CONNECTED. RECOVER DATA TO HDD?", a handler image B5 marked with "YES", a handler image B6 marked with "CANCEL", and a check box CK3 correlated with the message of "INCLUDE PDL DATA.". The user uses the operating unit 25 to perform an operation of selecting the handler image B5 in a case of recovering the data stored in the external storage medium 30 to the HDD 12 or the handler image B6 in a case of not recovering the data. The check box CK3 is selected in a case of including the PDL data in the data to be recovered to the HDD 12.

The operating control unit 214 transmits response data that indicates a response from the user to the processing apparatus 10 in response to an operational input on the recovery inquiry screen (Step S36). In the processing apparatus 10, the recovery control unit 116 determines whether to recover data based on the received response data (Step S37). In a case of a "YES" determination in Step S37, the recovery control unit 116 determines whether to recover the PDL data as well (Step S38). In a case of a "YES" determination in Step S38, the recovery control unit 116 recovers the data of the external storage medium 30 including the PDL data in the HDD 12 (Step S39). This recovery is performed in a case where, for example, the image forming apparatus 20 forms an image based on the PDL data.

In a case of a "NO" determination in Step S38, the recovery control unit 116 recovers the data of the external storage medium 30 excluding the PDL data in the HDD 12 (Step S40). This recovery is performed in a case where, for example, image formation based on the PDL data is not required.

In a case of a "NO" determination in Step S37, the recovery control unit 116 does not recover the data of the external storage medium 30 to the HDD 12.

Figure 11:
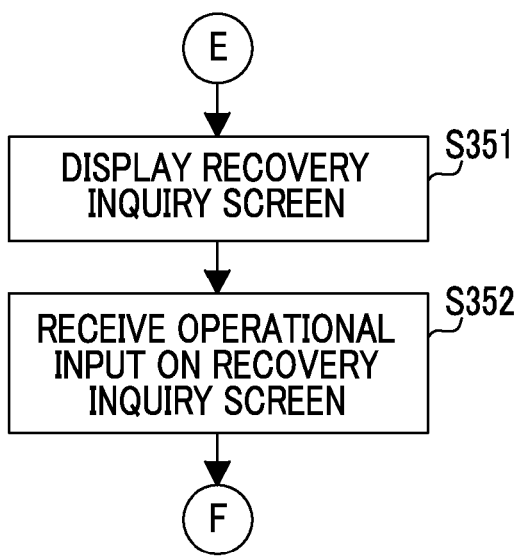
FIG. 11 is a diagram illustrating a process that is performed in a case of a "YES" determination in Step S33 of FIG. 9.

In a case of a "YES" determination in Step S33, that is, if the display device 40 is determined to be connected, the recovery control unit 116 transmits screen data used for displaying of the recovery inquiry screen to the display device 40 through the interface unit 14 and causes the display device 40 to display the recovery inquiry screen (Step S351 in FIG. 11). The recovery inquiry screen displayed in Step S351 may include the same information as the recovery inquiry screen described in FIG. 10. Then, the recovery control unit 116 receives an operational input that indicates a response from the user, in response to an operational input on the recovery inquiry screen (Step S352). This operation may be performed using an operator of the display device 40 if the display device 40 includes an operator or using an operator of the processing apparatus 10 if the processing apparatus 10 includes an operator. Then, Step S37 and the subsequent processes are performed in the processing apparatus 10 based on the response.

The processing apparatus 10 is rebooted if the processes described above are completed. The processing apparatus 10 may perform a control that causes the display unit 24 of the image forming apparatus 20 to display the state of the processing apparatus 10 being rebooted. As such, the processing apparatus 10 prompts the user to recover the data of the external storage medium 30 to the HDD 12 by notifying the user of information using the display unit 24 of the image forming apparatus 20.

D: Process Performed after Reboot

Figure 12:
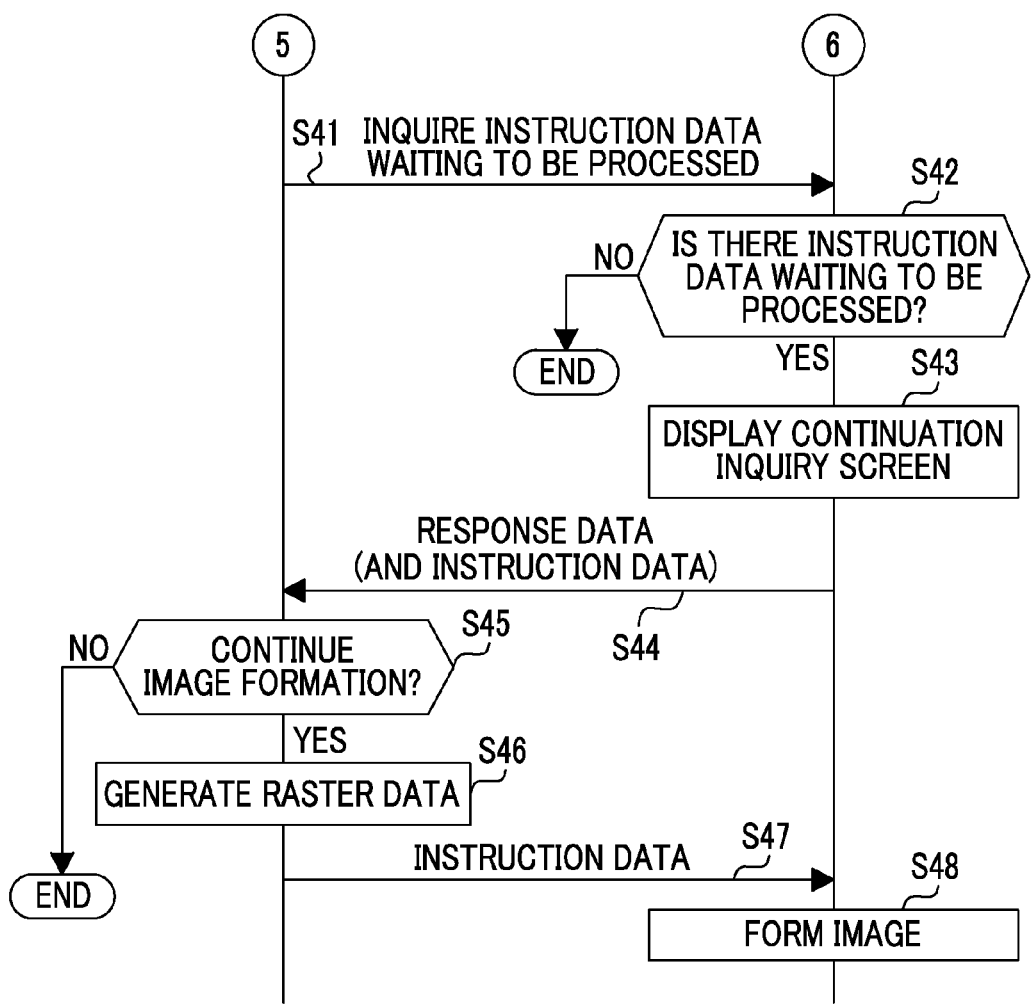
FIG. 12 is a sequence chart illustrating a process that is performed after reboot of the processing apparatus in the image forming system according to the exemplary embodiment.

FIG. 12 is a sequence chart illustrating a process after reboot of the processing apparatus 10 that is performed continuously after the process of FIG. 9 in the image forming system 1.

If the reboot of the processing apparatus 10 is completed, the instruction data transmission unit 113 inquires instruction data waiting to be processed of the image forming apparatus 20 (Step S41). The instruction data waiting to be processed is instruction data that is stored in the HDD 22 and on which a control for image formation is not performed by the formation control unit 212. In the image forming apparatus 20, if there is instruction data waiting to be processed (YES in Step S42), the display control unit 213 causes the display unit 24 to display a continuation inquiry screen (Step S43). The continuation inquiry screen is a screen that inquires whether to continue image formation based on the instruction data waiting to be processed.

The operating control unit 214 transmits response data that indicates a response from the user to the processing apparatus 10 in response to an operational input on the continuation inquiry screen (Step S44). In a case of continuing the image formation, the instruction data which is the target of the image formation is also transmitted in Step S44.

The instruction data transmission unit 113 determines whether to continue the image formation based on the instruction data waiting to be processed, based on the received response data (Step S45). In a case of a "YES" determination in Step S45, the raster data generation unit 112 interprets the intermediate data included in the received instruction data to generate the raster data (Step S46). Then, the instruction data transmission unit 113 transmits the instruction data that includes the generated raster data to the image forming apparatus 20 (Step S47). If the instruction data reception unit 211 receives the instruction data, the formation control unit 212 causes the image forming unit 23 to form an image based on the received instruction data (Step S48). Accordingly, the image formation based on the instruction data waiting to be processed is continued.

The processing apparatus 10 of the image forming system 1 described above notifies the user of the degradation status of the HDD 12 before a malfunction thereof using the display of the image forming apparatus 20 which is an apparatus other than a processing apparatus, even if a display device that displays information is not installed. Furthermore, the processing apparatus 10 duplicates the data of the HDD 12 to the external storage medium 30 and recovers data from the external storage medium 30 to the HDD 12. Accordingly, loss of data stored in the HDD 12 due to a malfunction of the HDD 12 is prevented, and data at the stage where the HDD 12 exhibits a sign of malfunction is recovered to the replaced HDD 12. In addition, since the duplication control and the recovery control are performed with connection of the external storage medium 30, the processing apparatus 10 may not include an operator.

Modification Example

The present invention may be embodied in different forms from the above exemplary embodiment. The modification example below described may be achieved by a combination of each exemplary embodiment.

Figure 13:
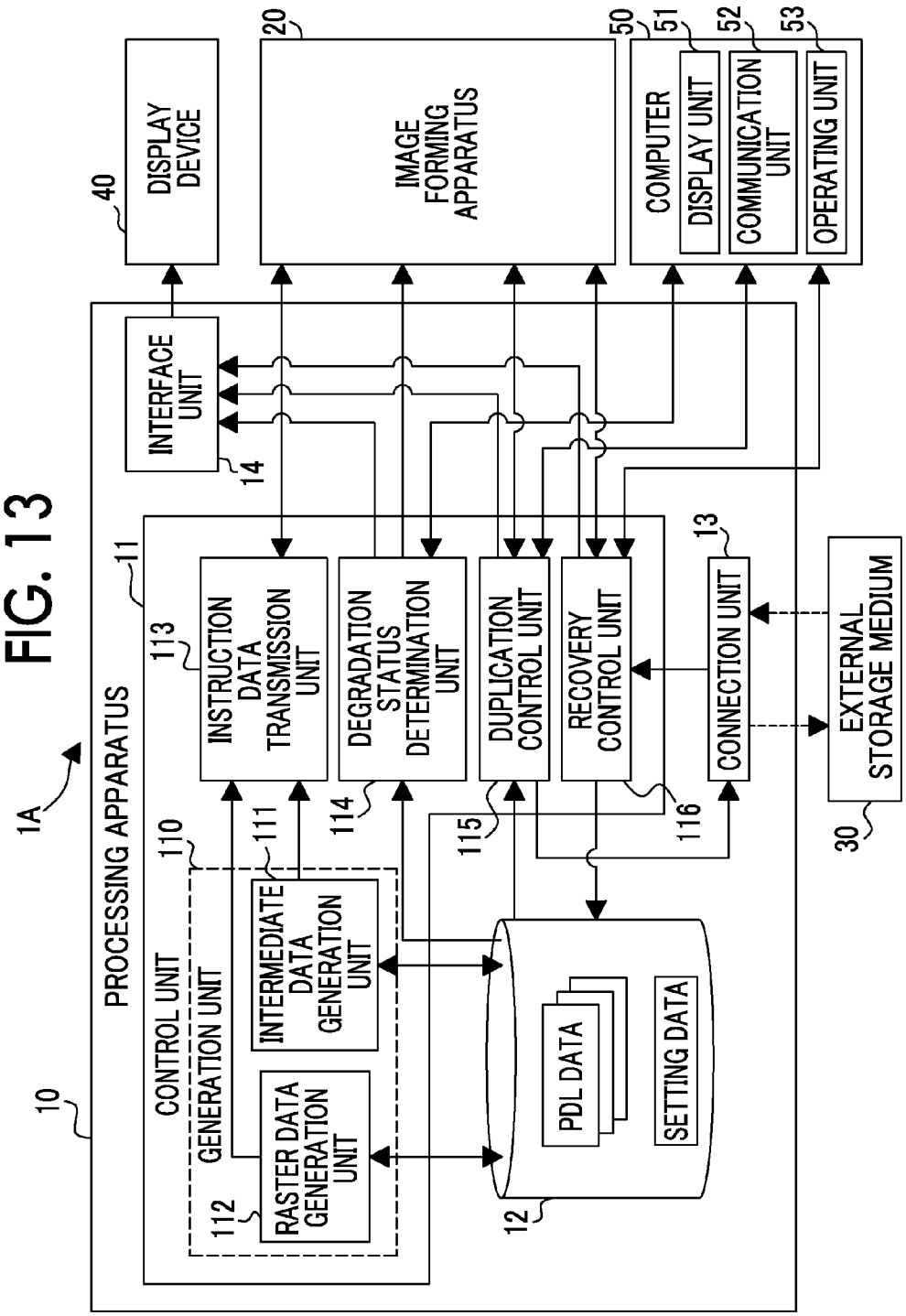
FIG. 13 is a block diagram illustrating an entire configuration of an image forming system according to one modification example of the present invention.

The image forming system of the present invention may be achieved by an image forming system 1A illustrated in FIG. 13. The image forming system 1A includes the image forming apparatus 20, the processing apparatus 10 that is provided in the image forming apparatus 20, and a computer 50 that requests the image forming apparatus 20 and the processing apparatus 10 to perform image processing and image formation. The computer 50 includes a display unit 51, a communication unit 52, and an operating unit 53. The display unit 51 is, for example, a liquid crystal display and functions as a display on the computer side of the image forming system 1A that displays information of the computer 50. The communication unit 52 includes, for example, a modem and functions as a communicator that communicates with the processing apparatus and the image forming apparatus 20. The processing apparatus 10, the image forming apparatus 20, and the computer 50 are connected to each other either directly or indirectly. The computer 50 may be directly connected to the image forming apparatus 20 through the communication unit 52, the image forming apparatus 20 maybe directly connected to the computer 50 and the processing apparatus 10, and the computer 50 may be connected to the processing apparatus 10 through the image forming apparatus 20.

The operating unit 53 includes, for example, a keyboard and a mouse and functions as an operator that receives an operational input from the user. The computer 50 transmits the PDL data to the processing apparatus 10 through the communication unit 52 and requests the processing apparatus 10 to perform image processing such as generation of the intermediate data or the raster data. Furthermore, the computer 50 requests the image forming apparatus 20 through the communication unit 52 to perform image formation. The computer 50 receives an operational input (response to inquiry) from the user through the operating unit 53.

The present modification example is different from the above exemplary embodiment in that the processing apparatus 10 causes the display unit 51 of the computer 50 to display an alert in addition to or instead of the display unit 24 of the image forming apparatus 20 when the display device 40 is not connected to the interface unit 14. That is, the degradation status determination unit 114 transmits notification data for notification of the HDD 12 satisfying the degradation condition and exhibiting a sign of malfunction to the image forming apparatus 20 and/or the computer 50. Then, the image forming apparatus 20 causes the display unit 24 to display the instruction inquiry screen in response to the received notification data. The computer 50 causes the display unit 51 to display the instruction inquiry screen in response to the received notification data.

The processing apparatus 10, regarding the duplication control, transmits notification data for notification of connection of the external storage medium 30 to the image forming apparatus 20 and/or the computer 50 when the display device 40 is not connected to the interface unit 14. The processing apparatus 10, regarding the recovery control, transmits notification data for notification of connection of the external storage medium 30 storing recovery data to the image forming apparatus 20 and/or the computer 50 when the display device 40 is not connected to the interface unit 14. The image forming apparatus 20 causes the display unit 24 to display the duplication inquiry screen or the recovery inquiry screen in response to the received notification data. The computer 50 causes the display unit 51 to display the duplication inquiry screen or the recovery inquiry screen in response to the received notification data.

A portion of the configurations and operation of the processing apparatus 10 and the image forming apparatus 20 may be omitted in the above exemplary embodiment. For example, one or more controls of "B: Duplication Control", "C: Recovery Control", and "D: Process after Reboot" may not be performed in the image forming system 1. In addition, a control that includes the PDL data at all times or does not include the PDL data at all times may be performed in the duplication control and the recovery control.

While the processing apparatus 10 includes one HDD 12 in the above exemplary embodiment, the processing apparatus 10 may include two or more of the HDD 12. The contents of the screens displayed in the image forming apparatus 20 described in the above exemplary embodiment are for illustrative purposes only.

The memory of the present invention is not limited to the HDD. The memory of the present invention may be a storage device such as a solid state drive (SSD), and the storing method thereof does not matter.

Color components that are used in the image forming system of the present invention are not limited to the four colors of Y, M, C, and K. Other colors may be used, or three or less colors or five or more colors may be used.

Each function achieved by the control units 11 and 21 described in the above exemplary embodiment may be achieved by one or multiple hardware circuits, maybe achieved by causing a computer to execute one or multiple programs for achievement of the same function, or may be achieved by a combination thereof. In a case of achieving the functions of the control units 11 and 21 using a program, the program may be provided in a state stored in a computer-readable recording medium such as a magnetic recording medium (magnetic tape, magnetic disk (HDD, flexible disk (FD)), and the like), an optical recording medium (optical disc and the like), a magneto-optical recording medium, or a semiconductor memory or may be distributed through a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
an image forming apparatus; and
a processing apparatus configured to communicate with the image forming apparatus,
wherein the processing apparatus includes
a memory that stores at least image data,
a generator that generates drawing data or intermediate data based on the image data stored in the memory, the intermediate data being intermediately generated in generation of the drawing data based on the image data,
a transmitter that transmits the drawing data or the intermediate data generated by the generator to the image forming apparatus,
a determiner that determines degradation status of the memory,
an interface unit that is used for connection of a processing-apparatus-side display device which displays information of the processing apparatus,
an intermediate data generator that interprets the drawing data to generate the intermediate data, and
a drawing data generator that generates the drawing data based on the intermediate data,
the image forming apparatus includes
an image former that forms an image on a medium based on the drawing data or the intermediate data received from the processing apparatus, and
an image-forming-apparatus-side display that displays information of the image forming apparatus,
the processing apparatus causes the image-forming-apparatus-side display to display an alert in a case where the determiner determines that the degradation status satisfies a predetermined condition, when the processing-apparatus-side display device is not connected to the interface unit, and
the transmitter transmits, to the image forming apparatus, the intermediate data in a case where the degradation status is determined to satisfy the condition and the drawing data in a case where the degradation status is determined not to satisfy the condition.

2. The image forming system according to claim 1, wherein the processing apparatus causes the image-forming-apparatus-side display and the processing-apparatus-side display device to display an alert in a case where the determiner determines that the condition is satisfied, when the processing-apparatus-side display device is connected to the interface unit.

3. The image forming system according to claim 2, wherein the processing apparatus includes
a connector to which an external storage medium is detachably connected, and
a duplication controller that stores, in the external storage medium, duplicated data which is obtained by duplicating data stored in the memory, when the external storage medium is connected in a case where the degradation status is determined to satisfy the condition.

4. The image forming system according to claim 3, wherein the processing apparatus causes the image-forming-apparatus-side display, when the processing-apparatus-side display device is not connected to the interface unit, and the processing-apparatus-side display device, when the processing-apparatus-side display device is connected to the interface unit, to display a screen that provides to a user an inquiry as to whether to duplicate the drawing data, and
the duplication controller controls whether to duplicate the drawing data in accordance with a response of the user to the inquiry as to whether to duplicate the drawing data.

5. The image forming system according to claim 4, wherein the processing apparatus causes the image-forming-apparatus-side display, when the processing-apparatus-side display device is not connected to the interface unit, and the processing-apparatus-side display device, when the processing-apparatus-side display device is connected to the interface unit, to display a screen that provides to a user an inquiry as to whether to recover data to the memory, in a case where the external storage medium connected to the connector stores the duplicated data, and
the processing apparatus includes
a recovery controller that controls whether to recover the data in accordance with a response of the user to the inquiry as to whether to recover the data.

6. The image forming system according to claim 3, wherein the processing apparatus causes the image-forming-apparatus-side display, when the processing-apparatus-side display device is not connected to the interface unit, and the processing-apparatus-side display device, when the processing-apparatus-side display device is connected to the interface unit, to display a screen that provides to a user an inquiry as to whether to recover data to the memory, in a case where the external storage medium connected to the connector stores the duplicated data, and the processing apparatus includes a recovery controller that controls whether to recover the data in accordance with a response of the user to the inquiry as to whether to recover the data.

7. The image forming system according to claim 1, wherein the processing apparatus includes a connector to which an external storage medium is detachably connected, and a duplication controller that stores, in the external storage medium, duplicated data which is obtained by duplicating data stored in the memory, when the external storage medium is connected in a case where the degradation status is determined to satisfy the condition.

8. The image forming system according to claim 7, wherein the processing apparatus causes the image-forming-apparatus-side display, when the processing-apparatus-side display device is not connected to the interface unit, and the processing-apparatus-side display device, when the processing-apparatus-side display device is connected to the interface unit, to display a screen that provides to a user an inquiry as to whether to duplicate the drawing data, and the duplication controller controls whether to duplicate the drawing data in accordance with a response of the user to the inquiry as to whether to duplicate the drawing data.

9. The image forming system according to claim 8, wherein the processing apparatus causes the image-forming-apparatus-side display, when the processing-apparatus-side display device is not connected to the interface unit, and the processing-apparatus-side display device, when the processing-apparatus-side display device is connected to the interface unit, to display a screen that provides to a user an inquiry as to whether to recover data to the memory, in a case where the external storage medium connected to the connector stores the duplicated data, and the processing apparatus includes a recovery controller that controls whether to recover the data in accordance with a response of the user to the inquiry as to whether to recover the data.

10. The image forming system according to claim 7, wherein the processing apparatus causes the image-forming-apparatus-side display, when the processing-apparatus-side display device is not connected to the interface unit, and the processing-apparatus-side display device, when the processing-apparatus-side display device is connected to the interface unit, to display a screen that provides to a user an inquiry as to whether to recover data to the memory, in a case where the external storage medium connected to the connector stores the duplicated data, and the processing apparatus includes a recovery controller that controls whether to recover the data in accordance with a response of the user to the inquiry as to whether to recover the data.

11. An image forming system comprising:

an image forming apparatus;

a processing apparatus configured to communicate with the image forming apparatus; and a computer that requests the image forming apparatus and the processing apparatus for image processing and image formation, wherein the computer includes a communicator that communicates with the processing apparatus and the image forming apparatus, and a computer side display that displays information of the computer, the processing apparatus includes a memory that stores at least image data, a generator that generates drawing data or intermediate data based on the image data stored in the memory, the intermediate data being intermediately generated in generation of the drawing data based on the image data, a transmitter that transmits the drawing data or the intermediate data generated by the generator to the image forming apparatus, a determiner that determines degradation status of the memory, an interface unit that is used for connection of a processing-apparatus-side display device which displays information of the processing apparatus, an intermediate data generator that interprets the drawing data to generate the intermediate data, and a drawing data generator that generates the drawing data based on the intermediate data, the image forming apparatus includes an image former that forms an image on a medium based on the drawing data or the intermediate data received from the processing apparatus, and an image-forming-apparatus-side display that displays information of the image forming apparatus, the processing apparatus causes the computer side display to display an alert in a case where the determiner determines that the degradation status satisfies a predetermined condition, when the processing-apparatus-side display device is not connected to the interface unit, and the transmitter transmits, to the image forming apparatus, the intermediate data in a case where the degradation status is determined to satisfy the condition and the drawing data in a case where the degradation status is determined not to satisfy the condition.

* * * * *